Patented May 26, 1953

2,640,069

UNITED STATES PATENT OFFICE 2,640,069

CONCENTRATION OF SECONDARY ALKYL SULFATE SALT SOLUTIONS

Pieter W. O. Wijga, Amsterdam, Netherlands, assignor to Shell Development Company, San Francisco, Calif., a corporation of Delaware No Drawing. Application December 31, 1949, Serial No. 136,400. In the Netherlands January 12, 1949

7 Claims. (Cl. 260—460)

This invention relates to the production of more concentrated aqueous solutions from less concentrated solutions of water-soluble salts of secondary alkyl sulfuric acid esters having 8 to 20 carbon atoms per molecule. It deals particularly with an improved method for effecting such concentrations by salting out in the absence of solvents whereby removal of water is achieved more economically than is possible by prior methods.

As ordinarily manufactured for use as detergents, wetting and emulsifying agents, etc., salts of secondary alkyl sulfuric acids esters, hereinafter referred to as ester salts, are produced by reacting olefins or secondary alcohols of 8 to 20 carbon atoms per molecule with sulfuric acid and neutralizing the sulfation product to obtain a relatively dilute aqueous solution of the desired ester salt. As a general rule, the concentration of ester salts in these solutions is of the order of about 20% to 25% by weight, and a small amount, usually about 10% to 30% by weight of the ester salt, of inorganic sulfate resulting from the neutralization of excess sulfating agent is also present. These solutions have to be concentrated before the ester salts are marketed.

The two methods currently used for concentrating these ester salt solutions are complete or partial evaporation of the water, or extraction with suitable organic solvents. Evaporation by spray-drying in a heated atmosphere or by drum-drying or the like is widely used for the production of ester salts in dry powder form. The method has the disadvantage, however, of requiring large quantities of heat and involves a heavy investment in expensive drying equipment. Extraction methods of concentration suffer from the same drawbacks since large amounts of solvent must be used and recovered.

Another known method for separating ester salts from their solutions consists in salting out the ester salts with sodium hydroxide. This method has the disadvantage that the upper layer rich in ester salts thus separated contains a high percentage of free sodium hydroxide which is undesirable in the product.

It has been proposed to avoid the difficulties inherent in the above concentration methods by salting out the ester salt solution with a salt, for example, common salt (NaCl), in the presence of a small quantity of certain organic polar solvents such as cyclohexanol, etc., as described and claimed in copending application, Serial No. 791,658, filed December 31, 1947 now U. S. Patent 2,522,212. The presence of the said solvents was considered essential in this method in order to insure effective separation of an ester salt phase with a high ester salt content because the addition of common salt alone was always found to result in practically no demixing.

It has now been found, however, that it is possible by proper control of the temperature to separate ester salts in a more concentrated form from their aqueous solutions by salting out with common salt without the addition of solvents or any further auxiliary substance. Thus, it has been found unexpectedly that by maintaining a temperature of at least 40° C., and preferably not exceeding 70° C., ester salts can be efficiently and substantially completely separated in more concentrated form from their aqueous solutions by salting out with sodium chloride.

The process according to the invention can be easily and cheaply carried out by salting out the aqueous solution of the ester salts of 8 to 20 carbon atoms by adding common salt at a temperature of 40° C. to 90° C., preferably 40° C. to 70° C., stratifying the resulting mixture and separating the two layers into which it is thereby split up. The upper layer thus separated is the concentrated ester salt product which often has an ester salt content of 40% or more. The bottom layer is an aqueous solution of common salt, the ester salt content of which is negligible. If, in addition to ester salt, the initial solution contains inorganic sulfate, the greater part of this latter substance will be contained in the bottom layer formed in the present process, so that the separated layer of concentrated ester salt will contain only little inorganic sulfate.

The minimum temperature of 40° C. used in the process according to the invention is essential to insure the desired separation of a layer of concentrated ester salt, since it was found that at lower temperature it was not possible to achieve such a separation after the addition of common salt. The optimum temperature limits within which smooth separation of the layers takes place on salting out according to the invention may vary somewhat, dependent upon the concentration and composition of the ester salt solution and the quantity of common salt added thereto. In general, very suitable limits range from 40° C. to 50° C. It is also possible, however, to carry out the process with good results at temperatures of from 50° C. to 70° C., although the separation will then be somewhat less smooth and the content of ester salt in the upper layer will be lower than at a temperature of approximately 45° C.. It is advisable not to select a temperature above 70° C. for the salting out because at such high temperatures the separation into layers generally proceeds still less smoothly. Temperatures exceeding approximately 90° C. are unsuitable, since at this temperature there is no, or only a very slow, separation of ester salt after the addition of common salt.

The quantity of common salt to be added to the ester salt solutions in the process according to the invention should preferably be sufficient to saturate the solutions at the temperature used in the process. In fact, it has been found that the addition of smaller quantities has an adverse effect on the results, since the separation into layers is then less complete, or even fails to occur.

The common salt required for salting out may be added at any stage of operations. Thus, it may be added before the ester salt solution is heated, although it is generally preferable to add the salt after the ester salt solution has been brought to the desired temperature.

A special feature of the invention in one of its preferred modifications consists in control of the concentration of the ester salts in the solution being salted out so as to obtain more efficient separation and concentration. Thus, it has been found that the lower the initial concentration of the ester salt solution at the time of salting out, the less time is required for the separation of a concentrated upper layer, and the higher the concentration of ester salt in this layer. In view of this, it is generally desirable in the present process to start from ester salt solutions with a content of active substance of less than 20%, preferably between approximately 5% and 10%.

In the case of solutions containing 20%–25% ester salt, such as are obtained by the sulfation of higher alkenes and the neutralization of the sulfation product, it is therefore preferable to dilute them to a concentration of 10% or less and to apply the salting out operation to the solution thus diluted. It is advantageous to use for this dilution the aqueous salt solution which has formed as a bottom layer during the salting out process. When carrying out the process according to the invention in a batchwise manner, part of the lower layer of aqueous salt solution from a previous separation can be added to the next charge of ester salt solution, while in a continuous process the aqueous salt phase separated can be recycled to the inlet of ester salt solution in order to reduce the ester salt concentration of the solution to be salted out to the desired value. When the salting out is carried out with an ester salt solution diluted to an ester salt concentration of less than 10%, the upper layer which is separated has, after being cooled, the consistency of a paste with an ester salt content of about 40% or more.

The upper layer obtained in the process of the invention can easily be further concentrated by centrifuging. Centrifuging is particularly important when starting from an upper layer which has been separated from an ester salt solution not previously diluted. The smoothest and most complete separation is generally obtained by centrifuging at elevated temperature, for example, between approximately 70° C. and 90° C. In this manner it is possible to obtain a product which is semi-solid at room temperature and has an ester salt content of approximately 60% or still higher.

The process of the invention is effective in the concentration of aqueous solutions of water-soluble salts of secondary alkyl sulfuric acid esters having 8 to 20 carbon atoms per molecule whether solutions of individual ester salts or mixtures of two or more such ester salts are used. Especially good results have been obtained with solutions of the alkali metal and ammonium salts, particularly the sodium salts, of secondary alkyl sulfuric acid esters of 8 to 18 carbon atoms, but the process is also effective with other water-soluble salts.

While the use of the new method in the recovery of ester salts from the aqueous solutions in which they are produced has been emphasized because it is an especially important application of the new method, it will be understood that the invention is not limited with respect to the source of the solutions treated. Thus, solutions encountered in the use of these ester salts may be concentrated in exactly the same way.

The process of the invention is further illustrated by the following examples in which the proportions given are in parts by weight.

*Example I*

One hundred parts of a technical solution of ester salt prepared from a sulfation product of a $C_{10}$—$C_{18}$ alkenes cracking fraction and containing approximately 21% sodium alkyl sulfates and approximately 5% sodium sulfate were diluted with 110 parts of water to an ester salt solution of 10% concentration.

The diluted solution thus obtained was then saturated with common salt at a temperature of approximately 45° C. The solution was maintained at approximately 45° C., when it split up into two phases. After the mass had been allowed to settle for one hour—at approximately 45° C.—the layers formed were separated. The separated upper layer (approximately 50 parts) was still pourable at 45° C., but assumed the consistency of a paste on cooling. It had an ester salt content of 42%. The bottom layer consisted of an aqueous solution of common salt and contained the greater part of the sodium sulfate present and approximately 0.1% of ester salt.

The separated concentrated paste was brought to a temperature of approximately 90° C. and then centrifuged, whereby 34 parts of a semi-solid product with an ester salt content of 61% were obtained.

When the ester salt solution was saturated with common salt at room temperature, there was practically no separation of an upper layer even after a prolonged time.

*Example II*

One hundred parts of the same technical ester salt solution as referred to in Example I were saturated with common salt at a temperature of 50° C. without dilution. After being allowed to settle for 1½ hours, during which the temperature was maintained at 50° C., the layers formed were separated. An upper layer of 84 parts was obtained with an ester salt content of approximately 25%. Centrifuging at 70° C. of this layer yielded a product containing approximately 38% ester salt.

I claim as my invention:

1. A process of producing a more concentrated aqueous solution of a water-soluble salt of a secondary alkyl sulfuric acid ester having 8 to 20 carbon atoms per molecule from a less concentrated aqueous solution thereof which comprises adding sufficient sodium chloride to substantially saturate the solution at a temperature of about 40° C. to 90° C., maintaining the mixture at a temperature within said range for at least ¼ hour until stratification takes place, in the absence of added organic solvent for said ester salt, into an ester salt layer having a higher ester salt to water ratio than said less concentrated solution and a sodium chloride layer substantially free from ester salts, and separating said layers.

2. A process of concentrating an aqueous solution of an alkali metal salt of a secondary alkyl sulfuric acid ester having 8 to 20 carbon atoms per molecule which consists essentially in saturating said solution at a temperature of about 40° C. to 70° C. with sodium chloride in the absence of any added organic solvent for said ester salt, maintaining the mixture within said temperature range until stratification takes place in the absence of added organic solvent for said ester salt, and separating the resulting ester salt phase of higher ester salt to water ratio from the aqueous sodium chloride phase formed.

3. A process of concentrating an aqueous solution of a sodium salt of a secondary alkyl sulfuric acid ester having 8 to 20 carbon atoms per molecule containing more than 10% by weight of said ester salt which comprises diluting said solution with water to reduce the concentration of the ester salts therein to between about 5% and 10%, adding sufficient sodium chloride to substantially saturate the solution at a temperature of about 40° to 70° C. in the absence of added organic solvent for said ester salt, maintaining the mixture within said temperature range until separation of the mixture into two phases takes place, and separating the resulting ester salt phase of higher ester salt to water ratio from the aqueous sodium chloride phase.

4. A process of concentrating an aqueous solution of a sodium salt of a secondary alkyl sulfuric acid ester having 10 to 18 carbon atoms per molecule and containing about 20% to about 25% by weight of said ester salt together with about 5% to 10% of sodium sulfate which consists essentially in diluting said solution with water to reduce the ester salt concentration to between about 5% and 10%, saturating the solution with sodium chloride at a temperature of 40° C. to 50° C., maintaining the mixture within said temperature range for about ¼ to about 2 hours to effect stratification in the absence of added organic solvent for said ester salt into two phases, and separating the resulting ester salt phase of higher ester salt to water ratio from the aqueous sodium chloride phase.

5. A process according to claim 3 wherein the dilution of the ester salt solution is carried out with a sodium chloride solution from a previous concentration.

6. A process of concentrating an aqueous solution of an alkali metal salt of a secondary alkyl sulfuric acid ester having 8 to 20 carbon atoms per molecule which comprises saturating said solution at a temperature of about 40° C. to about 50° C. with sodium chloride in the absence of any added organic solvent for said ester salt, maintaining the mixture within said temperature range until stratification takes place in the absence of added organic solvent for said ester salt, separating the resulting phases, and centrifuging the separated ester salt-rich phase at a temperature of about 70° C. to about 90° C. to recover therefrom ester salt in paste form having a higher ratio of ester salt to water than said separated ester salt-rich phase.

7. In a process of producing an aqueous solution of a water-soluble salt of a secondary alkyl sulfuric acid ester of 8 to 20 carbon atoms per molecule by reacting an olefin of 8 to 20 carbon atoms per molecule with sulfuric acid, neutralizing the resulting product with an aqueous solution of a base and concentrating the resulting ester salt solution, the improvement which comprises adjusting the concentration of the ester salt solution produced in said neutralization to an ester salt content of 5% to 10% by weight, adding sufficient solid sodium chloride to the solution at a temperature of about 40° C. to 70° C. to substantially saturate the solution and salt out substantially the ester salt content thereof in the absence of any added organic solvent for said ester salt, maintaining the mixture within said temperature range until stratification takes place in the absence of added organic solvent for said ester salt, separating the ester salt-containing phase and subjecting it to centrifugation at an elevated temperature to produce an ester salt product of higher ester salt to water ratio.

PIETER W. O. WIJGA.

References Cited in the file of this patent

UNITED STATES PATENTS

| Number | Name | Date |
|---|---|---|
| 2,111,911 | Fulton et al. | Mar. 22, 1938 |
| 2,522,212 | Dammers | Sept. 12, 1950 |

FOREIGN PATENTS

| Number | Country | Date |
|---|---|---|
| 498,008 | Great Britain | Dec. 28, 1938 |